(12) United States Patent
Anderson

(10) Patent No.: US 6,567,537 B1
(45) Date of Patent: May 20, 2003

(54) METHOD TO ASSESS PLANT STRESS USING TWO NARROW RED SPECTRAL BANDS

(75) Inventor: John Anderson, Stephens Church, VA (US)

(73) Assignee: Virginia Commonwealth University, Richmond, VA (US)

( * ) Notice: Subject to any disclaimer, the term of this patent is extended or adjusted under 35 U.S.C. 154(b) by 0 days.

(21) Appl. No.: 09/481,935

(22) Filed: Jan. 13, 2000

(51) Int. Cl.[7] .......................... G06K 9/00; G01N 33/48; G01N 33/50; G06F 19/00
(52) U.S. Cl. .......................................... 382/110; 702/19
(58) Field of Search ......................................... 382/110

(56) References Cited

U.S. PATENT DOCUMENTS 5,467,271 A * 11/1995 Abel et al. ...................... 702/5
5,567,947 A * 10/1996 Kebabian .................. 250/458.1
6,212,824 B1 * 4/2001 Orr et al. .................. 47/58.1 R
6,366,681 B1 * 4/2002 Hutchins ..................... 382/110

* cited by examiner

*Primary Examiner*—Leo Boudreau
*Assistant Examiner*—Hussein Akhavannik
(74) *Attorney, Agent, or Firm*—Whitham, Curtis & Christofferson, P.C.

(57) ABSTRACT

A system and method for assessing plant stress in agricultural crops or crop yields from non-invasive measurements. Aerial digital cameras filtered with two narrow ($\leq 25$ nanometers) spectral bandpasses provide digital matrix data representing the absorption spectrum of Chlorophyll α at 680 nm (red) and biomass reflectance at 770 nm (far red). The digital data is corrected and transformed by computer to generate an "Algorithm Image". The Algorithm Image represents the chlorophyll content for the stand of vegetation, and its interpretation provides information regarding plant stress and is useful in predicting crop yield.

13 Claims, 5 Drawing Sheets

METHOD TO ASSESS PLANT STRESS USING TWO NARROW RED SPECTRAL BANDS

This invention was made using equipment under the Cooperative Research and Development Agreement from the United States Army Topographic Engineering Center. The government may have certain rights in this invention.

BACKGROUND OF THE INVENTION

1. Field of the Invention

The invention generally relates to the analysis of plant stress in agricultural crops. In particular, the invention provides a method to remotely assess plant stress via aerial digital cameras filtered with two narrow ($\leq 25$ nanometers) spectral bandpasses representing the absorption spectrum of Chlorophyll α at 680 nm (red) and biomass reflectance at 770 nm (far red).

2. Background of the Invention

The ability to forecast yields and diagnose crop conditions prior to harvest is important for several reasons. Models that can effectively predict yields increase the opportunity to mitigate factors that may be adversely affecting the final yield at harvest, for example nutrient application or soil and water variability. To that end, the acquisition of remote sensor data has been introduced into precision agriculture and its use is increasingly popular. The development of small format systems are making it possible to acquire such data quickly and relatively inexpensively, and are also providing an added dimension for analysis when combined with geographic information systems (GIS).

The vast majority of remote sensor data presently being used by growers is in the form of the standard color infrared photograph. These data can be obtained through a variety of sources, including local extension services. However, they frequently do not possess the scale and temporal coverage required to perform truly efficient farm management. With the introduction of small format digital multispectral camera systems, growers now have the ability to acquire data that is multi-temporal and high in spectral and spatial fidelity. Unfortunately, given the amount of data multispectral imagery can produce, the agricultural community may easily suffer from a surfeit of information. If too much uncorrelated information is available at any one time, it becomes difficult to make effective management decisions. The most effective way for remote sensing to be an asset to the agricultural community at large is to tailor crop and regional specific models that can be validated and integrated into existing GIS databases. Also, in order for farmers to avail themselves of the technology, it must be available at a reasonable price.

Numerous studies indicate strong relationships between reflectance, nutrient concentration (N) and productivity of crops. Walberg et al. (1982) successfully demonstrated the synergistic effects of these parameters on corn plants. Also, Schepers et al. (1996) determined specific wavelengths that were particularly effective in determining nutrient and water content for corn. Chappelle et al. (1992) discovered that specific band ratios could be used to determine chlorophyll A (CHLA), chlorophyll B (CHLB), and carotenoid concentrations in soybean plants. Other studies relating optical measurements to plant productivity involve the use of chlorophyll meters that measure the reflectance or transmittance of leaf chlorophyll sampled in vivo (Blackmer and Schepers, 1994). Peng et al. (1996) and Garcia et al. (1996) recently described the effective use of chlorophyll meters to manage high yield rice. However, while such field techniques can be effective in productivity analysis, they do not provide a synoptic way to view crops that can be integrated with other spatial data such as GIS.

There is a need in the field of agriculture for remote sensing models that provide remote sensing of crops that can be integrated with other spatial data, that are demonstrably efficient, that are intelligible to the grower, and that are available at reasonable prices.

SUMMARY OF THE INVENTION

It is an object of this invention to provide a method for assessing plant stress in agricultural crops.

It is another object of this invention to provide a method to predict crop yields from non-invasive measurements.

According to the system of the invention, a plurality of digital cameras are employed for taking images of a stand of vegetation at different wavelengths. One of the cameras takes images at wavelengths associated with the absorption spectrum of chlorophyll, and another takes images at wavelengths associated with biomass reflectance. The system also includes a means to correlate the images taken by the cameras and to compute an Algorithm Image for the stand of vegatation, as well as a means to display the calculated Algorithm Image.

The invention provides a method for predicting plant stress. This is accomplished by gathering a plurality of digital images using a photographic system comprised of multiple digital cameras equipped with narrow bandpass filters set to detect wavelengths of light corresponding to specific pigment and biomass response regions for vegetation, correcting the digital data from the images, and transforming the data to an Algorithm Image which represents the chlorophyll content for the stand of vegetation. The Algorithm Image is then interpreted to predict crop yields.

In a preferred embodiment of the invention, the digital cameras are connected to a fixed wing aircraft, and the images are gathered via aerial photography. In a preferred embodiment of the instant invention, the images are gathered while maintaining a high sun angle and bi-directional effects are limited by using, for example, a north to south flight line.

The transformation of the digital data into an Algorithm Image is accomplished by calculating a ratio which results in a Red/Far Red Data Product, and combining the digital image of the chlorophyll absorption wavelength with the Red/Far Red Data Product. The Algorithm Image is created by mapping the first digital image and the Red/Far Red Data Product to different color guns.

The Algorithm Image is interpreted by comparing the variations in intensity of the colors which are selected for the mapping step. In general, the brightest, most intense colors indicate higher chlorophyll content, and in general, high chlorophyll content will correlate positively with high crop yields.

DETAILED DESCRIPTION OF THE PREFERRED EMBODIMENTS OF THE INVENTION

Figure 1:
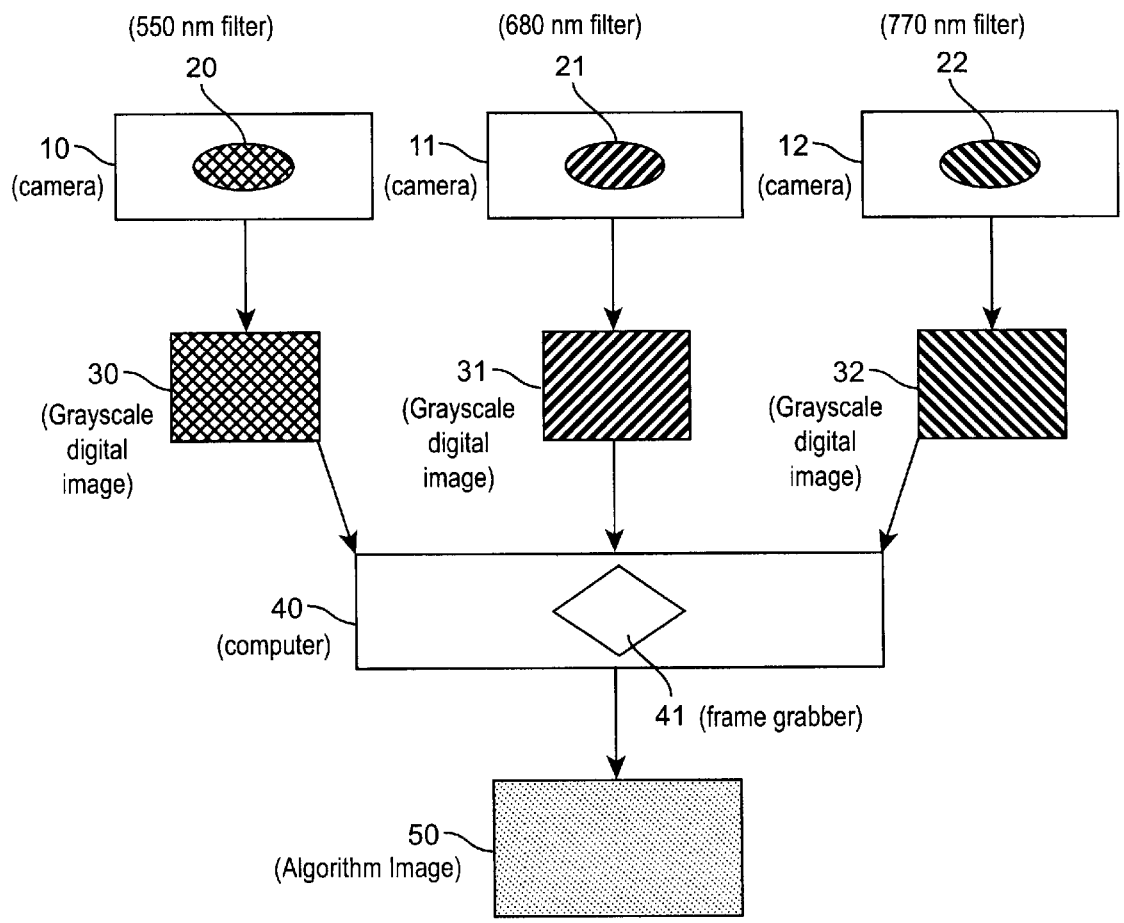
FIG. 1. Schematic of camera set-up.

The present invention provides methods to remotely assess plant stress in agricultural crops using "reflectance red-far red" spectral bands, and narrowband, digital multispectral imagery. By "plant stress" we mean conditions which impact plants such as, but not limited to, nutrient stress, water stress, insect damage, weed competition, and the like. Those of skill in the art will recognize that many such conditions exist, variations in which can impact on plants. The information gathered by the methods of the present invention with respect to plant stress is useful for making decisions regarding treatment of a crop during growth (e.g. to assess the need for the application of nutrients). This ability gives farmers the opportunity to correct factors related to crop development at an early stage in the growing process. Also, the methods of the present invention may be used to identify specific "trouble zones" that may have water or soil problems, and thus allow for appropriate modifications in agricultural strategy. Further, as demonstrated in Example 2 below, the data obtained may be used to predict crop yields.

The method of the present invention detects plant stress for a given stand of vegetation using data generated from digital aerial images. The images are obtained using a photographic system comprised of multiple digital cameras. The cameras are equipped with narrow bandpass filters set to detect wavelengths of light corresponding to specific pigment and biomass response regions for vegetation. The digital data from the images is then corrected and transformed by computer to generate an "Algorithm Image". The Algorithm Image represents the chlorophyll content for the stand of vegetation, and its interpretation provides information regarding plant stress and is useful in predicting crop yield.

In a preferred embodiment of the present invention, digital multispectral imagery is collected during aerial missions flown at a time and altitude such that a high sun angle is maintained. In a specific embodiment of the present invention, the altitude was about 2,250 meters above terrain and the time is approximately 1130 local solar time. The conditions of altitude and time should be such that an appropriate ground sample distance (the smallest distance resolvable by the imaging system in use, e.g. about 1.5 meter) is obtained. Useful ground sample distances are in the range of one to two meters. To limit bi-directional effects, a north to south flight line is used. In order to develop an accurate model of the particular stand of vegetation, missions should be flown at intervals specific to the growing conditions of the crop being analyzed. For example, when new conditions are introduced into a field (e.g. a new crop, nutrient source, or pesticide) it may be desirable to closely monitor the crop at intervals during the entire growth season in order to ascertain the effect of the new condition. However, if a field has been in use previously and its "character" is already established, it may be desired to obtain data only once near the time of harvest in order to predict crop yields. Those of skill in the art will recognize that the number of data acquisitions to be carried out during the practice of the present invention may vary from case to case and may be any suitable number which is required in order to obtain the desired data.

A preferred embodiment of the invention is schematically depicted in FIG. 1. In this embodiment, three digital cameras 10, 11 and 12 are utilized. The three cameras 10, 11 and 12 are preferably mounted on a fixed-wing aircraft. Each camera is filtered with a narrow bandpass interference filter 20, 21 and 22, and a narrow spectral range (e.g. $\leq 25$ nanometers) is utilized. In a preferred embodiment, filters 20, 21 and 22 are centered at 550, 680 and 770 nm, respectively. The 550 nm spectral band (green region) represents chlorophyll reflectance and is not used to produce the final Algorithm Image 50. Instead, this band may be used in conjunction with the other two bands (680 and 770 nm) to create a standard false color (infrared) composite, if desired. The generation of false color composites is well-known to those of skill in the art. The generation of such a composite in conjunction with the practice of the present invention is an optional convenience. The data for two of the necessary wavelengths (680 nm and 770 nm) will be at hand, having been gathered for the practice of the present invention, and the 550 nm data can be gathered and the composite generated in a facile manner. Further, a comparison of the false color composite to the Algorithm Image of the present invention may aid in developing an overall assessment of the stand of vegetation. The 680 nm spectral band represents a fixed chlorophyll absorption region. The 770 nm spectral band represents the plant tissue (i.e. biomass) reflectance region. Each camera 10, 11 and 12 generates a gray scale (panchromatic) numeric digital matrix image 30, 31 and 32, respectively, processed in real time as the aircraft moves over a stand of crops. The cameras 10, 11 and 12 are interfaced to a frame grabber 41 which resides in a computer 40. Preferably, the computer 40 has a Pentium II™ or better processor. The images 30, 31 and 32 are collected and stored via the frame grabber 41 for further processing to generate an "Algorithm Image" 50. Details of the further processing to generate the Algorithm Image are given below.

A variety of appropriate digital cameras, filters, frame grabbers and personal computers are commercially available and their use is well-known to those of skill in the art. For example, the cameras may be COHU™ cameras with 12 mm focal lengths, Corion Optics™ 25 nm wide bandpass interference filters may be utilized, and the cameras may be interfaced to an AT Vista™ or MATROX™ frame grabber via a Pentium II™ computer.

Further, some correction procedures for the imagery data may also be applied. For example, the imagery data may be corrected by co-registration of the spectral bands to compensate for aircraft motion at the time of acquisition. These corrections are performed outside of the image capture environment. Procedures for such corrections are straightforward and well-known to those of skill in the art.

Figure 2:
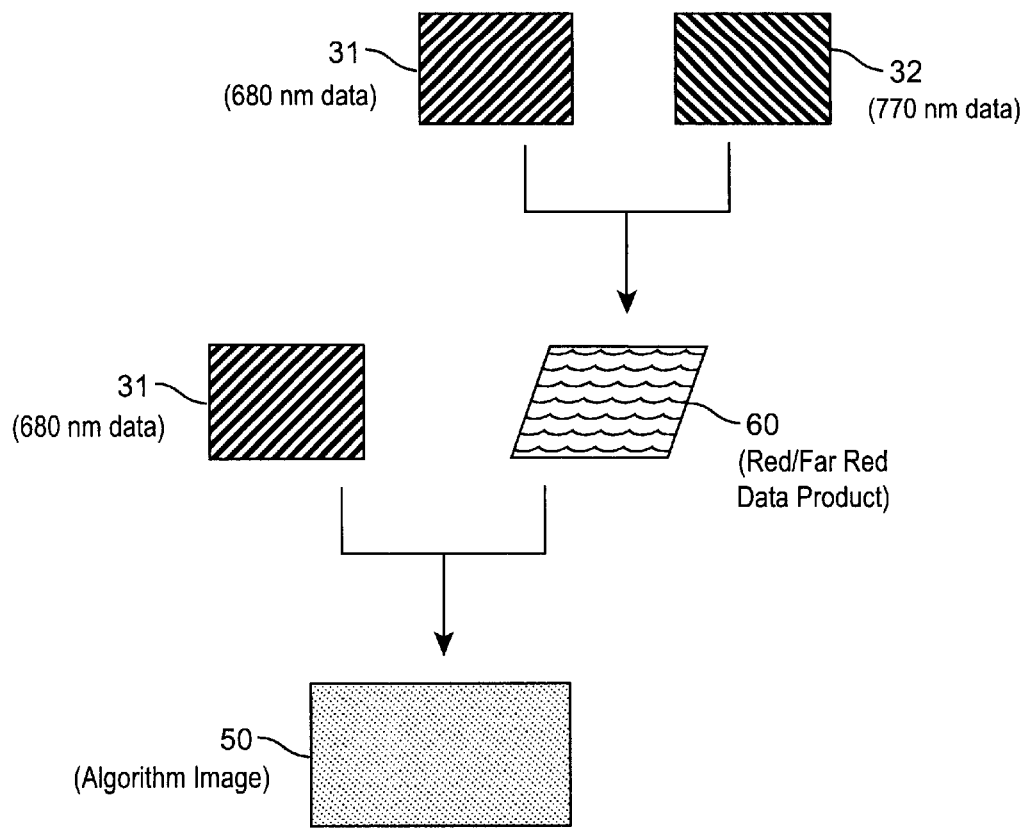
FIG. 2. Schematic of Algorithm Image generation.

Generation of the Algorithm Image 50 is effected by further processing of the data as schematically depicted in FIG. 2. The 680 nm wavelength data 31 and the 770 nm wavelength data 32 are processed using Formula 1. In other words, the numeric values of the digital matrix obtained at 680 nm are divided by the numeric values of the digital matrix obtained at 770 nm, and 128 is added to the resulting numeric values for normalization. The resulting set of transformed digital numbers (DNs) constitutes a "Red/Far Red Data Product" 60. The Red/Far Red Data Product 60 represents a modified ratio of the red (680 nm) to far-red (770 nm) data. The term "modified" is used because the 770 nm band actually falls within the near infrared, not the far-red region. Standard software available with, for example, the AT Vista™ and MATROX™ generation of frame grabbers permits the facile generation of such data products.

680 nm/770 nm+128                                  Formula 1

Finally, the unprocessed 680 nm data 31 is used again together with the Red/Far Red Data Product 60 to generate a visual product or "Algorithm Image" 50. The Algorithm Image 50 is created by selectively mapping the unprocessed 680 nm spectral band data 31 and the Red/Far Red Data Product 60 to different color guns. In a preferred embodiment of the present invention, the 680 nm spectral band is mapped to the red and blue color guns (producing a magenta color) and the Red/Far Red Data Product is mapped to the green color gun. The Algorithm Image 50 is thus a vegetation map which depicts chlorophyll in green and soils and non-green vegetation in magenta (blue+red). Other color forming devices may also be used in the practice of this invention. The Algorithm Image 50 represents the chlorophyll content for the stand of vegetation and evaluation of the Algorithm Image 50 gives indications of the condition of the crop with respect to nutrient stress. Variations in the intensity of the image, which may, for example, be displayed as variations in the intensity of color, represent variations in chlorophyll content. For example, in a preferred embodiment of the present invention, the brightest green colors are indicative of higher chlorophyll content while the darker green tones indicate areas where chlorophyll is not as concentrated in plants. In general, high chlorophyll content is positively correlated with robust crop conditions and is predictive of high yield, whereas low chlorophyll content may be indicative of a need for remediation.

In a preferred embodiment of the present invention, final output for the Algorithm Image is in a Joint Photographic Experts Group (JPEG) format and Tagged-Image File Format (TIFF). These formats are standard and well-known to those in the art, and are compatible with most agriculture-based geographic information systems. The Algorithm Image can thus be readily correlated with data from agriculture-based geographic information systems. For example, the Algorithm Image of the present invention may be correlated with registered yield maps generated by the AgLink™ computer program by Agris Corporation.

Figure 3:
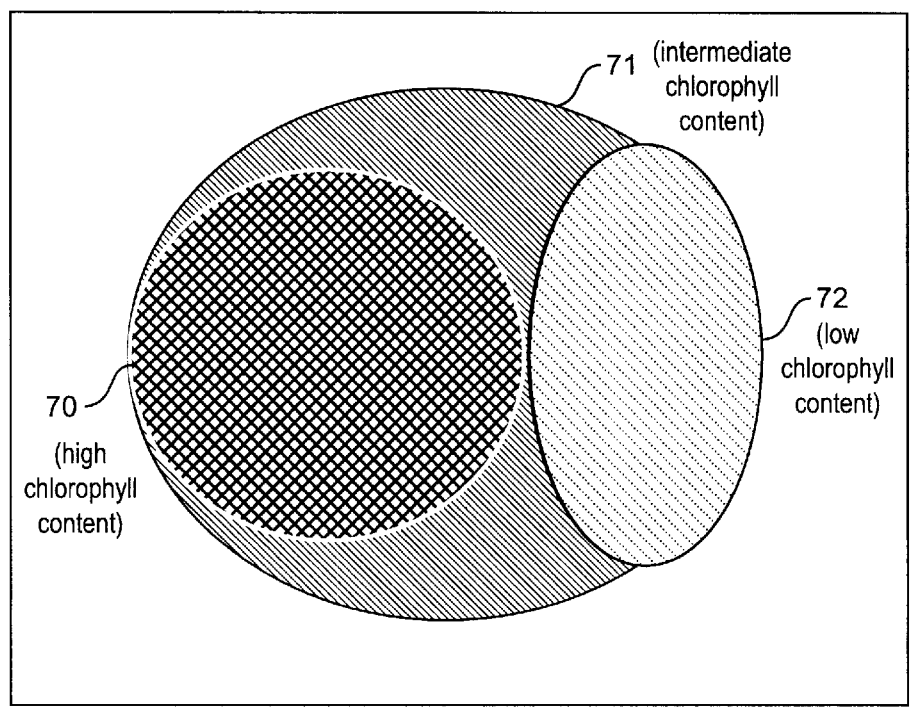
FIG. 3. Example of an Algorithm Image

The Algorithm Image produced by the method of the present invention may be offered as a tool to the agricultural community in digital or hard copy format. The data will be available in the form of an Algorithm Image in which the shading and intensity of the coloring will be indicative of the chlorophyll content of the crop, as illustrated in black and white in FIG. 3. FIG. 3 is a schematic representation of an Algorithm Image of the vegetation in a field in which the darkest areas (70) have the highest chlorophyll content, the medium-dark areas (71) have an intermediate level chlorophyll content, and the lightest areas (72) have the lowest chlorophyll content. The data may also be expressed in the form of a graph or chart. If enough temporal data is obtained, trend tables may also be provided. For example, it is envisioned that acquisition of the data would be scheduled at specific times during the local growing season and that customers would be provided access (via Internet accounts) to a specific site on the Internet to download recent or historical image products and analyses for their fields.

In a preferred embodiment of the present invention, the crop which was monitored was soybeans. However, one of skill in the art will recognize that other crops (for example, cotton, wheat and corn) may also be monitored by the methods of the invention.

EXAMPLES

Methods

Study Site

This study used two soybean fields at Montague Farms near Center Cross, Va., located in the Middle Peninsula region bordering the Chesapeake Bay. The region is characterized by sandy loam soils that are suitable for a variety of crops including corn, cotton, and small grains. Montague Farms, Inc. is a large operation that grows soybeans for shipping to Asian and domestic markets. The farm also grows other grains such as wheat and corn. The irrigated area is approximately 60 hectares and was planted with soybean lines MFS 591 and MFS516 (two private lines for the Japanese market) and MFL 550 (a black bean grown for the Korean market). The non-irrigated (Taylor's field) is approximately 20 ha. This field was planted with MFS 591 (Taliaferro, 1998).

Multispectral Imagery

Digital multispectral imagery was collected in two missions (August and October) during the 1998 local growing season. To maintain a high sun angle, mission were flown at an altitude of 2,250 meters (above terrain) at approximately 1130 local solar time. This altitude produced imagery with a 1.5 meter ground sample distance. To limit bi-directional effects, a north to south flight line was used. The multispectral system was comprised of three COHU™ cameras (using 12 mm focal lengths) interfaced to an AT Vista™ frame grabber via a Pentium II™ computer. Each camera was filtered with a Corion Optics™ 25 nm wide bandpass interference filter. Images were collected at the indicated wavelengths. The band centers were 550 nm (chlorophyll reflectance), 680 nm (chlorophyll absorption), and 770 nm (near infrared-NIR tissue reflectance).

Correlation of Algorithm Image Data with Registered Yield Maps

An AgLink™ software package was used to download data at the time of harvest from a combine outfitted with a differential global positioning system (GPS) unit. An Algorithm Image which had been generated by the methods of the present invention at the same location prior to harvest was co-registered with the yield data and random pixel values (n=125) were extracted and analyzed by linear regression to determine statistical correlations between the two sets of data. Using this procedure, the resultant r values can range from 0 to 1, and the higher the r value, the more positive the correlation between the values being compared.

Example 1

Generation of an Algorithm Image.

Using the methods of the present invention, an Algorithm Image of irrigated soybeans at Montague Farms in Center Cross, Va. was generated (similar to FIG. 3). The image produced showed the irrigated region in green with the brightest green colors indicative of higher chlorophyll content. Darker tones indicated areas where chlorophyll is not as concentrated in the plants. The image produced is a tool that could be effectively used by the agricultural community to assist in precision farming and nutrient management.

Example 2

Correlation of Imagery and Yield by Combine

Figure 4:
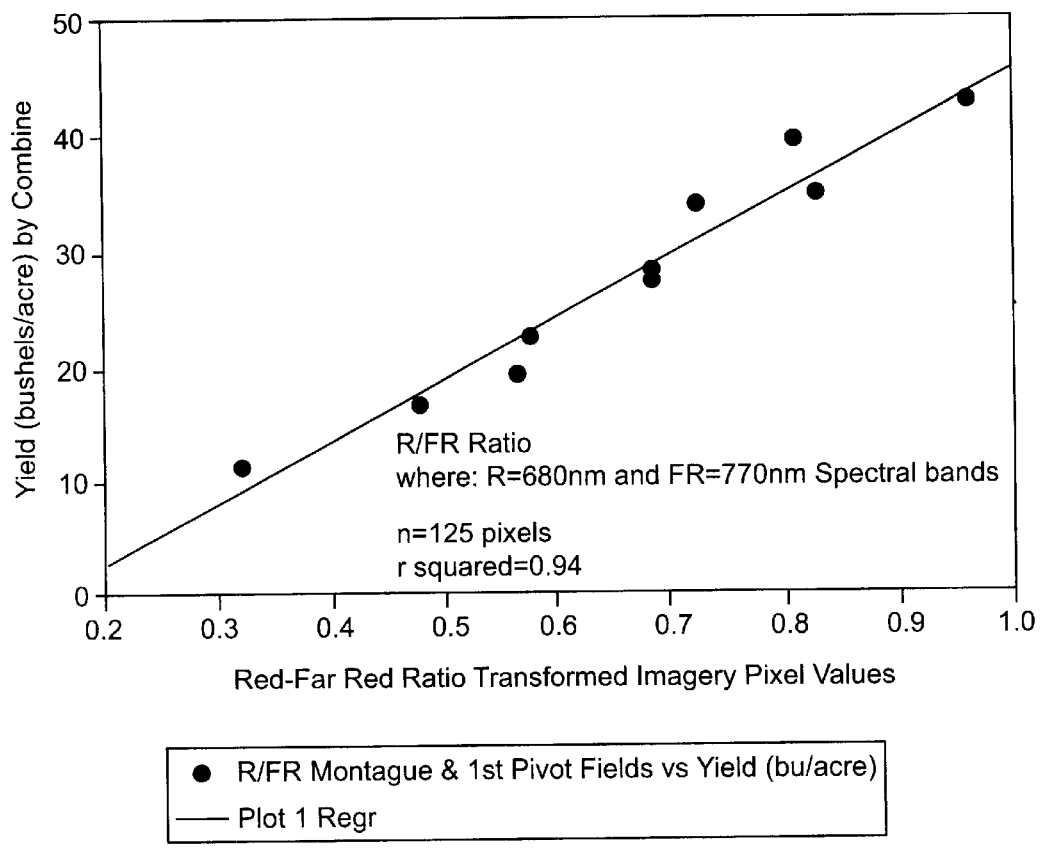
FIG. 4. Statistical correlation of Algorithm Image data (transformed imagery pixel values, x axis) and data from an AGRIS™ registered yield map (bushels per acre, y axis), for a non-irrigated field.
Figure 5:
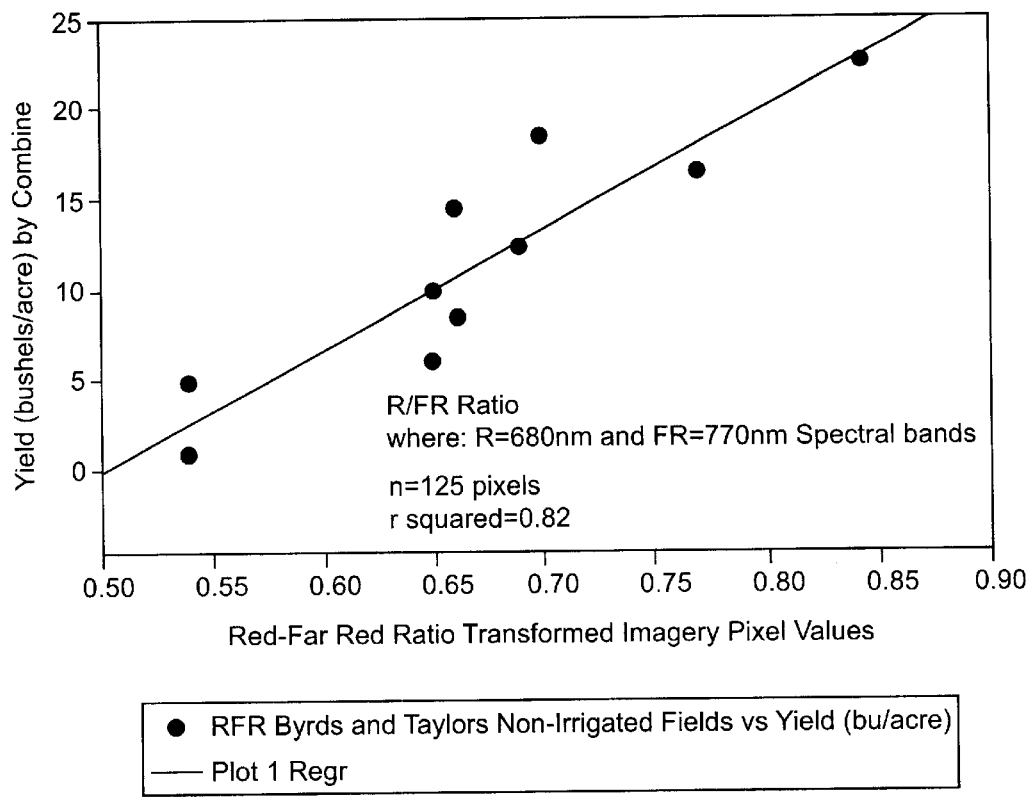
FIG. 5. Statistical correlation of Algorithm Image data (transformed imagery pixel values, x axis) and data from an AGRIS™ registered yield map (bushels per acre, y axis), for an irrigated field.

Field numbers from registered yield maps from both irrigated and non-irrigated fields were used to develop regressions with the transformed imagery digital numbers (DNs) of a single Algorithm Image obtained prior to harvest. The results showed that the Algorithm Image values were highly correlated with the yield data obtained from the field (FIGS. 4 and 5). As can be seen, the irrigated and non-irrigated data resulted in r values of 0.94 and 0.82, respectively, indicating a very high correlation between the two sets of data. These results indicate that the Algorithm Image is an effective predictor of yield early in the local growing season before the harvest.

While the invention has been described in terms of its preferred embodiments, those skilled in the art will recognize that the invention can be practiced with modification within the spirit and scope of the appended claims. Accordingly, the present invention should not be limited to the embodiments as described above, but should further include all modifications and equivalents thereof within the spirit and scope of the description provided herein.

I claim:

1. A plant stress prediction system comprising a plurality of digital cameras for taking images of a stand of vegetation at different wavelengths, a first of said cameras taking images at wavelengths associated with the absorption spectrum of chlorophyll, a second of said cameras taking images at wavelengths associated with biomass reflectance;

means for computing an Algorithm Image for said stand of vegetation; and means for displaying said computed Algorithm Image, wherein said Algorithm Image is produced from digital matrix data obtained from two spectral bandpasses of less than or equal to 25 nm where a first of said two spectral bandpasses includes 680 nm and a second of said two spectral bandpasses includes 770 nm, and where the digital matrix data for the first of said two spectral bandpasses is mapped to a first color forming device and a red/far red data product obtained from the formula ((680 nm/770 nm)+128) is mapped to a second color forming device where said first and second color forming devices form different colors.

2. The system of claim 1 further comprising a third digital camera taking images at wavelengths associated with chlorophyll reflectance.

3. The system of claim 2 wherein said wavelength associated with chlorophyll reflectance is 550 nm.

4. The plant stress prediction system of claim 1 wherein said first color forming device forms a magenta color and said second color forming device forms a green color.

5. A method for predicting plant stress or crop yield, said method comprising the steps of:

gathering a plurality of digital images using a photographic system comprised of a plurality of digital cameras equipped with narrow bandpass filters set to detect wavelengths of light corresponding to specific pigment and biomass response regions for vegetation;

transforming said digital images to an "Algorithm Image" representing a chlorophyll content for a stand of vegetation; and interpreting said Algorithm Image information to predict plant stress or crop yield, wherein said step of transforming said digital images into an "Algorithm Image" further comprises the steps of:

calculating a ratio of a first digital image of a chlorophyll absorption wavelength and a second digital image of a near infrared plant tissue reflectance wavelength;

normalizing said ratio to produce a Red/Far Red Data Product; and combining said first digital image of a chlorophyll absorption wavelength with said Red/Far Red Data Product, to produce said Algorithm Image, wherein said combination is created by mapping said first digital image and said Red/Far Red Data Product to different color forming devices.

6. The method of claim 5 further comprising a step of correcting said digital images prior to said transforming step.

7. The method of claim 6 wherein said step of correcting is carried out by co-registration of the spectral bands to compensate for aircraft motion at the time of image acquisition.

8. The method of claim 5 wherein said wavelengths of light corresponding to specific pigment response regions for vegetation are selected from the group consisting of: 680 nm and 550 nm.

9. The method of claim 5 wherein said wavelength of light corresponding to specific biomass response regions for vegetation is 770 nm.

10. A method as recited in claim 5, wherein said gathering step is performed using aerial photography.

11. A method as recited in claim 10, wherein said gathering step is performed by maintaining a high sun angle and bi-directional effects are limited by using a north to south flight line.

12. The method of claim 5 wherein said steps of calculating a ratio and normalizing said ratio are carried out simultaneously by utilizing the formula:

$$680 \text{ nm}/770 \text{ nm}+128.$$

13. A method as recited in claim 5, wherein the step of interpreting said Algorithm Image further comprises the step of comparing a standard false color image with said Algorithm Image.

* * * * *